A. PAQUIN.
ELECTROMAGNETIC TUBE TESTING DEVICE.
APPLICATION FILED AUG. 29, 1918.

1,302,424.

Patented Apr. 29, 1919.
2 SHEETS—SHEET 1.

WITNESSES
Frederick Diehl.

INVENTOR
Alonzo Paquin
BY
ATTORNEYS

A. PAQUIN.
ELECTROMAGNETIC TUBE TESTING DEVICE.
APPLICATION FILED AUG. 29, 1918.

1,302,424.

Patented Apr. 29, 1919.
2 SHEETS—SHEET 2.

WITNESSES
Frederick Diehl.
C. Bradway

INVENTOR
Alonzo Paquin
BY
ATTORNEYS

UNITED STATES PATENT OFFICE.

ALONZO PAQUIN, OF MONTREAL, QUEBEC, CANADA.

ELECTROMAGNETIC TUBE-TESTING DEVICE.

1,302,424.　　　　　Specification of Letters Patent.　　Patented Apr. 29, 1919.

Application filed August 29, 1918. Serial No. 251,938.

*To all whom it may concern:*

Be it known that I, ALONZO PAQUIN, a subject of the King of Great Britain, and a resident of Montreal, in the Province of Quebec and Dominion of Canada, have invented a new and Improved Electromagnetic Tube-Testing Device, of which the following is a full, clear, and exact description.

This invention relates to a device for testing the bore of a non-magnetic tube for locating the presence of projecting edges, lumps or° other imperfections that would prevent the insertion or drawing of wire through the tube.

The invention has for its general objects to provide a simple, effective and reliable testing device of this character which embodies a floating armature or magnetic element which maintains a stationary position within the bore of the traveling tube being tested under the action of magnetic forces, until an obstruction or imperfection in the bore is reached, when the armature is moved out of the magnetic field, which results in the giving of a signal.

For a more complete understanding of the invention reference is to be had to the following description and claims taken in connection with the accompanying drawings, which illustrate certain embodiments of the invention and wherein similar characters of reference indicate corresponding parts in all the views, in which—

Figure 1:
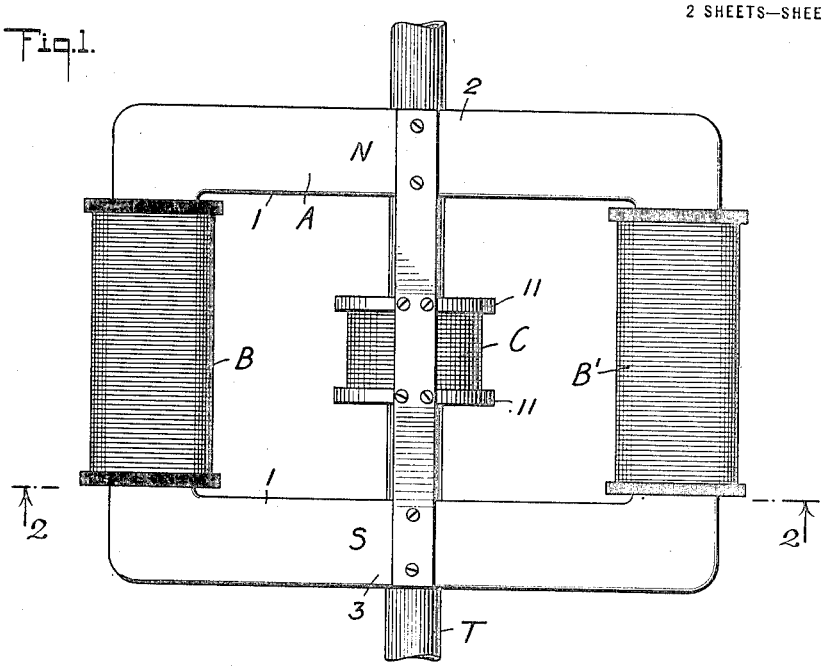
Figure 1 is a plan view of the testing device.
Figure 2:
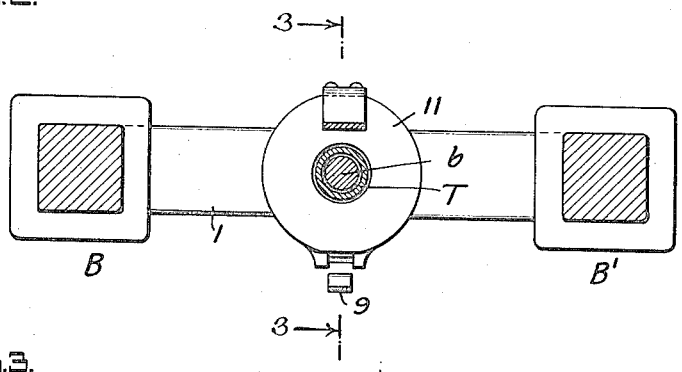
Fig. 2 is a vertical section on the line 2—2, Fig. 1.

Referring to the drawing, A designates a magnetic field energized by coils B and B' so wound that the legs 1 of the magnetic field will have consequent north and south poles at the points 2 and 3, and located between these poles is a magnet coil C for controlling the switch of a signal circuit. The magnetic field may be made solid for direct current, but will be laminated for alternating current. At the consequent poles 2 and 3 are alining openings 4 and 5 which aline with the bore 6 of the spool for the coil C, so that the tube T to be tested can pass through the axis of the device. In the tube is a floating armature or magnetic bar $b$ which is maintained stationary in the position shown in Fig. 3 as long as the traveling tube being tested has a perfect bore, but when any obstruction in the bore is encountered the armature $b$ is moved out of its normal position, whereby there is a disturbance in the magnetic field of force resulting in a signal being given to warn the operator that an imperfect part of the tube has been found.

Figure 3:
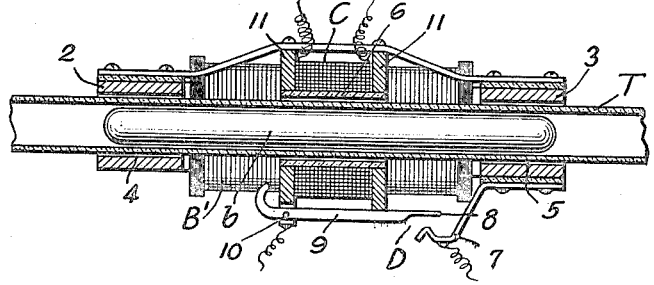
Fig. 3 is a detail sectional view on the line 3—3, Fig. 2.

The coil C controls a signal switch D which, as shown in Fig. 3, comprises a fixed contact 7 and a movable contact 8 which is carried by an armature 9 pivoted at 10 on one of the heads 11 of the coil C. These heads are magnetic, so that under normal conditions they pull the armature 9 so that the contact 8 will be in open circuit position. When the magnetic bar $b$ is in the normal position shown in Fig. 3, the switch D is open, but when the said bar is moved by engaging an obstruction in the traveling tube T, the magnetic attraction is diminished, so that the switch D will close and energize the signal.

Figure 4:
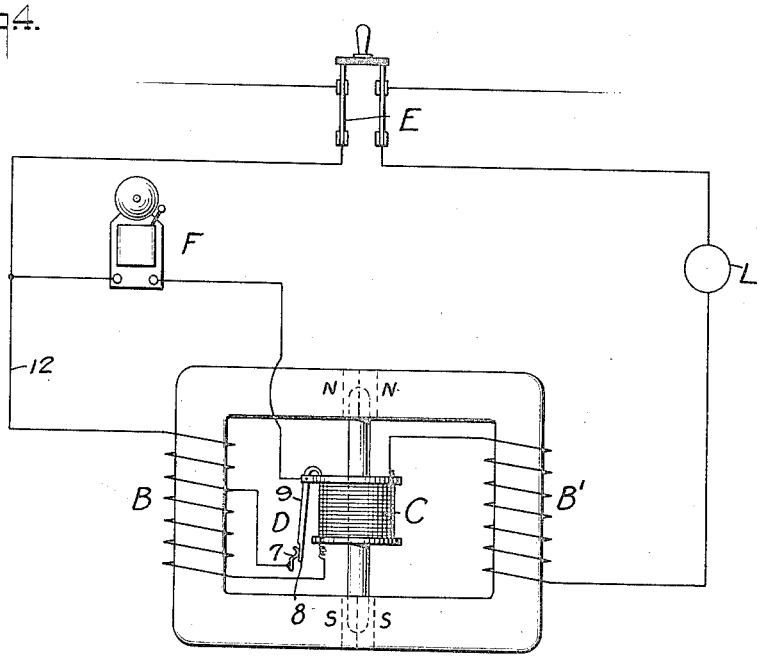
Figs. 4 and 5 are diagrammatic views showing the testing device adapted respectively for direct and alternating current circuits.

The device when used in connection with direct current is connected as shown in Fig. 4. The coils B and B' are made with relatively coarse wire and both wound in the same direction and are connected in series with each other, with the signal coil C in series relation between them and reversely wound. The windings B and B' are connected with a suitable source of current through a controlling switch E. The signal switch D is connected with the winding B and with the bell F, which is in turn connected with one of the lead wires 12, whereby the signal will be in shunt relation to a portion of the winding B. In the circuit is a pilot lamp L which indicates whether or not current is passing through the machine to the device.

Figure 5:
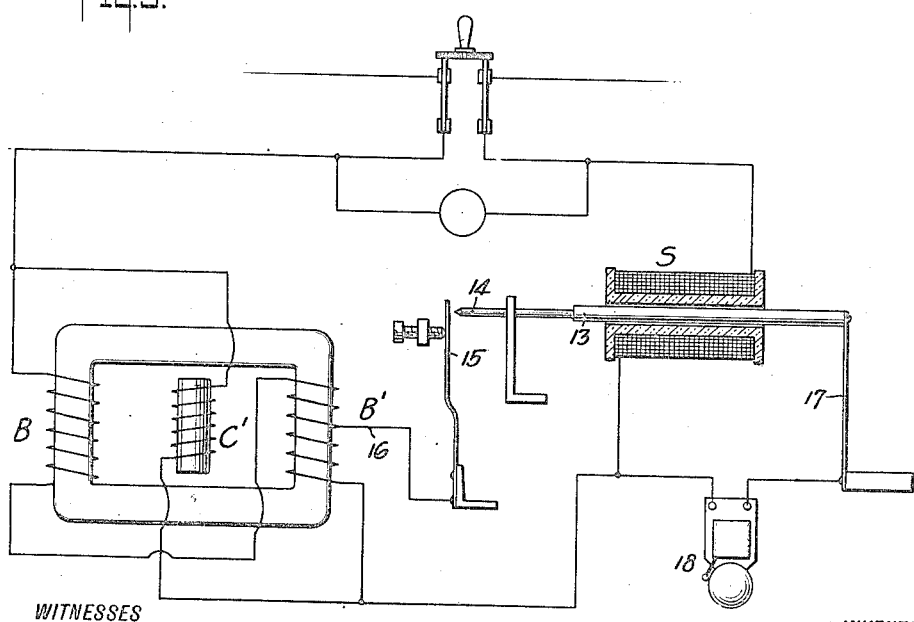

When alternating current is employed the testing device is connected in circuit, as shown in Fig. 5. The coils B and B' are wound in the same direction, clockwise, for instance, and the signal coil C' is wound in the opposite direction, or anti-clockwise. The coils B and B' are in series and the coil C' is in shunt relation thereto. In series with the main coils B and B' is a signal coil S which has a plunger 13 having an extremity 14 that forms a movable contact that is adapted to engage an adjustable contact 15, which latter is connected by a tap 16 with a suitable portion of the coil B', whereby the latter acts as an autostarter. The core 13 is connected with a spring 17, which is in turn connected with a signal bell 18 that connects with the coil B'. When the floating magnetic bar in the coil C' is moved from its normal position the induction in the circuit is reduced and the current will increase to its maximum, whereby the plunger 13 will be actuated to close the bell circuit of the contacts 14 and 15, thereby indicating the fact that there is an imperfection in the tube being tested.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. A tube testing device of the class described comprising a magnetic circuit, means associated therewith for creating consequent north and south poles, a floating armature disposed between the poles and adapted to float in the tube being tested, and signal means actuated when the said armature moves from its normal position.

2. A tube testing device of the class described comprising a magnetic circuit, means associated therewith for creating consequent north and south poles, a floating armature disposed between the poles and adapted to float in the tube being tested, and indicating means responsive to changes in the magnetic field between the poles when the armature moves from its normal position.

3. A device of the class described comprising a magnetic closed circuit having tube guiding means, means associated with the circuit for creating poles at the said means, a coil located between the poles, a floating armature associated with the coil, and means coöperating with the coil to energize the signal when the armature moves from normal position.

4. A device of the class described comprising a closed magnetic circuit having apertures at opposite points through which the tube to be tested is adapted to pass, windings on the said magnetic circuit to produce a consequent pole at each opening, a floating armature located between the openings, a coil through which the armature extends, and a signal device controlled by the coil to indicate the movement of the armature from normal position.

ALONZO PAQUIN.